US012712830B2

(12) United States Patent
R et al.

(10) Patent No.: US 12,712,830 B2
(45) Date of Patent: Aug. 18, 2026

(54) CONVERSATIONAL ARTIFICIAL INTELLIGENCE REGRESSION ENSEMBLE

(71) Applicant: Elevance Health, Inc., Indianapolis, IN (US)

(72) Inventors: Channabasava R, Bengaluru (IN); Prasad Halkur Shankar Rao, Bengaluru (IN)

(73) Assignee: Elevance Health, Inc., Indianapolis, IN (US)

( * ) Notice: Subject to any disclaimer, the term of this patent is extended or adjusted under 35 U.S.C. 154(b) by 73 days.

(21) Appl. No.: 18/971,785

(22) Filed: Dec. 6, 2024

(65) Prior Publication Data

US 2025/0193134 A1 Jun. 12, 2025

Related U.S. Application Data

(60) Provisional application No. 63/607,900, filed on Dec. 8, 2023.

(51) Int. Cl.
*H04L 51/02* (2022.01)
*G06F 40/30* (2020.01)

(52) U.S. Cl.
CPC .............. *H04L 51/02* (2013.01); *G06F 40/30* (2020.01)

(58) Field of Classification Search
CPC ......... H04L 51/02; H04L 41/16; G06F 40/30; G06F 40/35; G06F 7/023; G06N 20/00;
(Continued)

(56) References Cited

U.S. PATENT DOCUMENTS 11,431,660 B1 * 8/2022 Leeds ..................... H04L 51/02
11,722,598 B2 8/2023 Willshire et al.
(Continued)

FOREIGN PATENT DOCUMENTS

EP 3736726 A1 11/2020

OTHER PUBLICATIONS

International Search Report and Written Opinion for related International Application No. PCT/2024/058863, 10 pages, mailed Mar. 11, 2025.

(Continued)

*Primary Examiner* — Michael Won
(74) *Attorney, Agent, or Firm* — Morgan, Lewis & Bockius LLP

(57) ABSTRACT

A method of improving chatbot accuracy includes receiving an input test file containing chatbot interactions data including utterances, expected intents, and expected responses. For each interaction, the method may generate predicted intents and responses using an AI-based chatbot trained on previous interaction data. The method may determine similarity between predicted and expected responses/intents by calculating Levenshtein distances and comparing to predetermined thresholds. Failed interaction keywords may be extracted using natural language processing to identify failing topics. Machine learning decision tree classification may analyze patterns in failed interactions to generate resolution suggestions. The method may generate an interactive dashboard displaying historical performance trends, domain-specific accuracy metrics, visualizations of frequently keywords, and confidence distributions for failed interactions. This automated regression testing approach enables efficient identification and resolution of chatbot performance issues while maintaining response quality.

20 Claims, 11 Drawing Sheets

(58) Field of Classification Search
CPC .... H04N 21/251; H04N 21/466; H04N 21/45; H04N 21/4662
See application file for complete search history.

(56) References Cited

U.S. PATENT DOCUMENTS

| | | | | |
|---|---|---|---|---|
| 12,126,768 | B2 * | 10/2024 | Willshire | G06F 40/35 |
| 12,141,535 | B2 * | 11/2024 | Galitsky | G06N 3/08 |
| 12,353,832 | B1 * | 7/2025 | Panda | G06F 40/30 |
| 2021/0158811 | A1 * | 5/2021 | Di Fabbrizio | G10L 13/00 |
| 2023/0036072 | A1 | 2/2023 | Gao | |
| 2023/0237275 | A1 | 7/2023 | Wang et al. | |
| 2023/0308405 | A1 * | 9/2023 | Zabrzenski | G06F 40/30 |
| 2023/0342557 | A1 * | 10/2023 | Hasan | G06F 40/35 |
| 2024/0126794 | A1 * | 4/2024 | Cook | H04L 51/02 |
| 2025/0097171 | A1 * | 3/2025 | Hu | G06F 8/35 |
| 2025/0191713 | A1 * | 6/2025 | Alperin | G06N 5/01 |

OTHER PUBLICATIONS

Cabot et al., “Testing challenges for NLP-intensive bots”, 2021 IEEE/ACM Third International Workshop on bots in software engineering (BOTSE), IEEE, Jun. 4, 2021, pp. 31-34.

* cited by examiner

FIG. 4B
412
Intelligent Regression Suite
Execution History
Test Case Increment by Run
416
414

418

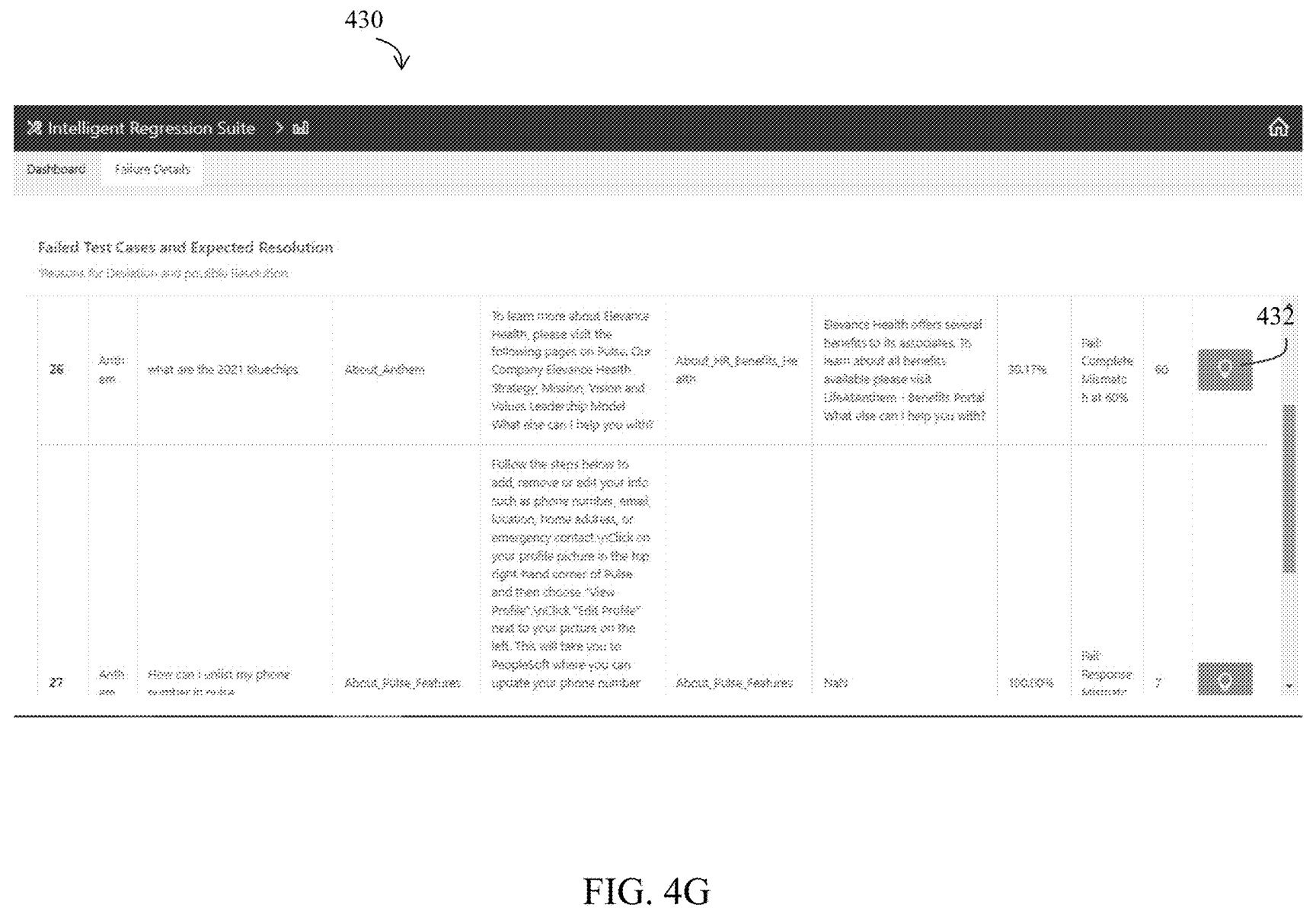

430

Intelligent Regression Suite

Dashboard Failure Details

Failed Test Cases and Expected Resolution

Reasons for Deviation and possible Resolution

| | | | | | | | | | | |
|---|---|---|---|---|---|---|---|---|---|---|
| 26 | Anthem | what are the 2021 bluechips | About_Anthem | To learn more about Elevance Health, please visit the following pages on Pulse. Our Company Elevance Health Strategy, Mission, Vision and Values Leadership Model What else can I help you with? | About_HR_Benefits_Health | Elevance Health offers several benefits to its associates. To learn about all benefits available please visit LifeatAnthem - Benefits Portal What else can I help you with? | 30.17% | Fail: Complete Mismatch at 60% | 60 | 432 |
| 27 | Anthem | How can I unlist my phone number in pulse | About_Pulse_Features | Follow the steps below to add, remove or edit your info such as phone number, email, location, home address, or emergency contact.\nClick on your profile picture in the top right hand corner of Pulse and then choose "View Profile".\nClick "Edit Profile" next to your picture on the left. This will take you to PeopleSoft where you can update your phone number | About_Pulse_Features | NaN | 100.00% | Fail: Response Mismatch | 7 | |

FIG. 4G

CONVERSATIONAL ARTIFICIAL INTELLIGENCE REGRESSION ENSEMBLE

CROSS-REFERENCE TO RELATED APPLICATIONS

This application claims priority to and the benefit of U.S. Provisional Application No. 63/607,900, filed Dec. 8, 2023, the entirety of which is incorporated herein by reference.

TECHNICAL FIELD

The disclosed implementations relate generally to human-machine natural language (e.g., chatbot) interactions, and relate more specifically to regression analysis to improve the results of chatbot interactions.

BACKGROUND

A chatbot is a software application used to conduct an online chat conversation via text, or text-to-speech, in lieu of providing direct contact with a live human agent. Chatbots can maintain a conversation with a user in a natural language, understanding the intent of the human on the other end of the conversation. Chatbots can reply to the user's inquiries, based on preset rules and data.

Designed to convincingly simulate the way a human would behave as a conversational partner, chatbot systems typically require continuous tuning and testing to ensure the answers given by the chatbot. This is typically accomplished using regression testing. Regression testing is re-running functional and non-functional tests to ensure that previously developed and tested software still performs well after a change. A record is kept of certain test cases required to test a chatbot software. After making any change to the software, regression testing may be used to verify if the existing functions and performance are not impacted by the change.

However, manual regression testing is time consuming, especially for large chatbots with heavy knowledge base. Because of the commitment of time and resources required, regression testing is not being done frequently, resulting in response degradation in the performance of the chatbot in a live environment.

Accordingly, it would be desirable for systems and methods to exist for performing a complete regression of NLP intensive chatbots, with the use of non-binary text matching to get accurate results.

SUMMARY

One general aspect of the present disclosure includes a method of improving an accuracy of a natural language processing system for use in a chat bot. The method also includes receiving, by a computing device, an input test file via an input test file upload interface, the input test file may include data relating to a plurality of chat bot interactions, where, for each of the plurality of chat bot interactions, the input test file contains data relating to an utterance, an expected intent, and an expected response. The method also includes standardizing, by a computing device, the data contained in the input test file. The method also includes, for each of the plurality of chat bot interactions: generating, using an artificial intelligence-based chatbot, using the utterance, a predicted intent and a predicted response, where the artificial intelligence-based chatbot is trained using previous chat bot interaction data including previous utterances, previous expected intents, previous responses, and data relating to whether a previous response successfully addressed the utterance. The method also includes determining, by a computing device, whether a respective predicted response and/or a predicted intent is sufficiently similar to a respective expected response and/or an expected intent including comparing at least one of: (i) the expected intent to the predicted intent and (ii) the expected response to the predicted response by. The method also includes calculating a Levenshtein distance between the expected intent and the predicted intent and/or the expected response and the predicted response. The method also includes determining whether the Levenshtein distance exceeds a predetermined threshold. The method also includes in response to a determination that the Levenshtein distance exceeds the predetermined threshold, determine that the respective expected response and/or intent is not sufficiently similar to the respective predicted response and/or intent, and labeling the determination a failed result. The method also includes, in response to a determination that the Levenshtein distance falls below the predetermined threshold, determining that the respective expected response and/or intent is sufficiently similar to the respective predicted response and/or intent, and labeling the determination a passed result. The method also includes performing statistical analysis on the failed results and the passed results. The method also includes generating a regression test result user interface displaying an indication designating the respective chat bot interactions as passed or failed results.

Implementations may include one or more of the following features. The method may include generating an output file including the utterance, the expected intent, the expected response, the predicted intent, the predicted response, and data relating to the determination of whether the expected response value is sufficiently similar to the predicted response value. The generating the regression test result user interface further may include generating a visualization that emphasizes the more frequently appearing failed interaction keywords by extracting a plurality of failed interaction keywords from the output file, the plurality of failed interaction keywords being associated with a subset of the plurality of chatbot interactions where the expected response value is not sufficiently similar to the predicted response value. The method may include using a machine learning decision tree classification to suggest a resolution to a failed result. The method may include the steps of determining whether the expected response value is sufficiently similar to the predicted response value, generating error reason data, for each of a subset of the plurality of chatbot interactions where the expected response value is not sufficiently similar to the predicted response value; displaying the error reason data; receiving user input, representing a change to the expected response value; applying the change to the expected response value to the expected response value to create an updated expected response value; using the natural language processing to evaluate the updated expected response value in view of the predicted response value; and returning an updated determination of whether the predicted response is sufficiently similar to the updated expected response.

One general aspect includes a method of improving an accuracy of a natural language processing system for use in a chat bot. The method also includes receiving data relating to a plurality of chat bot interactions, the data for each of the plurality of chatbot interactions may include data relating to an utterance, an expected intent, and an expected response. The method also includes, for each of the plurality of chat bot interactions: generating, using an artificial intelligence-based chatbot, using the utterance, a predicted intent and a predicted response. The method also includes determining, by a computing device, whether a respective predicted response or a respective predicted intent is sufficiently similar to a respective expected response or a respective expected intent. The method also includes in response to a determination that respective expected response and/or intent is not sufficiently similar to the respective predicted response and/or intent, labeling the determination a failed result. The method also includes in response to a determination that the respective expected response and/or intent is sufficiently similar to the respective predicted response and/or intent, and labeling the determination a passed result. The method also includes performing statistical analysis on the failed results and the passed results. The method also includes generating a regression test result user interface displaying an indication designating the respective chat bot interactions as passed or failed test interactions. Other embodiments of this aspect include corresponding computer systems, apparatus, and computer programs recorded on one or more computer storage devices, each configured to perform the actions of the methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 4A through 4H are exemplary user interface renderings in accordance with one aspect of the present disclosure.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
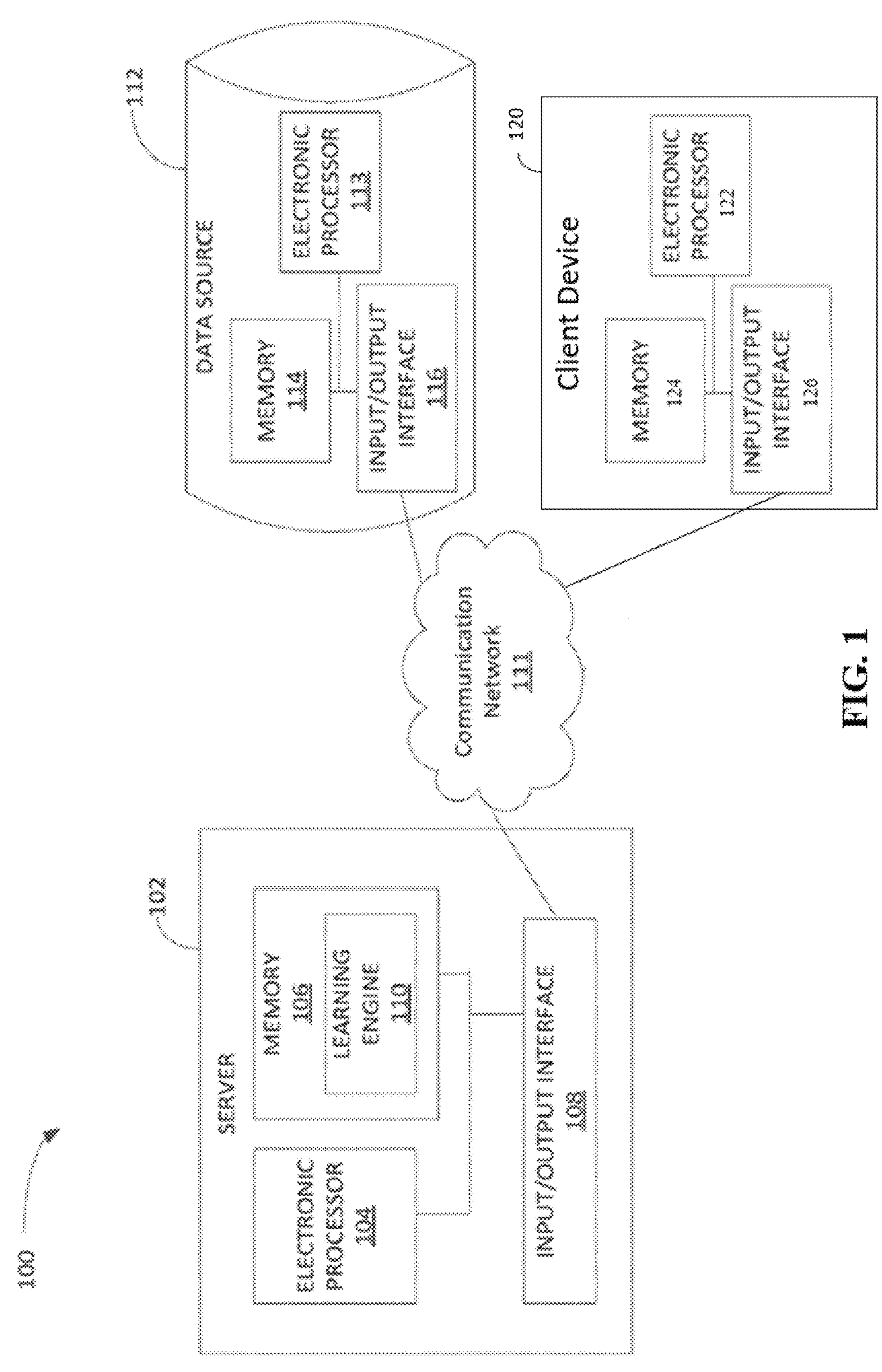
FIG. 1 is a block diagram of a system in accordance with one aspect of the present disclosure.

FIG. 1 illustrates a system 100 for implementing chatbot regression testing and analysis, according to some embodiments of the invention. The system 100 includes a server 102 that includes a plurality of electrical and electronic components that provide power, operational control, and protection of the components within the server 102. For example, as illustrated in FIG. 1, the server 102 may include an electronic processor 104 (e.g., a microprocessor, application-specific integrated circuit (ASIC), or another suitable electronic device), a memory 106 (e.g., a non-transitory, computer-readable storage medium), and an input/output interface 108. The electronic processor 104, the memory 106, and the input/output interface 108 communicate over one or more connections or buses. The server 102 illustrated in FIG. 1 represents one example of a server, and embodiments described herein may include a server with additional, fewer, or different components than the server 102 illustrated in FIG. 1. Also, in some embodiments, the server 102 performs functionality in addition to the functionality described herein. Similarly, the functionality performed by the server 102 (i.e., through execution of instructions by the electronic processor 104) may be distributed among multiple servers. Accordingly, functionality described herein as being performed by the electronic processor 104 may be performed by one or more electronic processors included in the server 102, external to the server 102, or a combination thereof.

The memory 106 may include read-only memory ("ROM"), random access memory ("RAM") (e.g., dynamic RAM ("DRAM"), synchronous DRAM ("SDRAM"), and the like), electrically erasable programmable read-only memory ("EEPROM"), flash memory, a hard disk, a secure digital ("SD") card, other suitable memory devices, or a combination thereof, which may include transitory memory, non-transitory memory, or both. The electronic processor 104 executes computer-readable instructions ("software") stored in the memory 106. The software may include firmware, one or more applications, program data, filters, rules, one or more program modules, and other executable instructions. For example, the software may include instructions and associated data for performing the methods described herein. For example, as illustrated in FIG. 1, the memory 106 may store a chatbot module (e.g., "software") 110 for performing one or more of the functions described herein, which may include chatbot services, chatbot API services, fuzzy match logic, data visualization, machine learning, artificial intelligence, or the like. However, in other embodiments, the functionality described herein as being performed by the chatbot module 110 may be performed through one or more software modules stored in the memory 106 or external memory.

The input/output interface 108 allows the server 102 to communicate with devices external to the server 102. For example, as illustrated in FIG. 1, the server 102 may communicate with one or more data sources 112 through the input/output interface 108. In particular, the input/output interface 108 may include a port for receiving a wired connection to an external device (e.g., a universal serial bus ("USB") cable and the like), a transceiver for establishing a wireless connection to an external device (e.g., over one or more communication networks 111, such as the Internet, a local area network ("LAN"), a wide area network ("WAN"), and the like), or a combination thereof.

In some embodiments, the server 102 also receives input from one or more peripheral devices, such as a keyboard, a pointing device (e.g., a mouse), buttons on a touch screen, a scroll ball, mechanical buttons, and the like through the input/output interface 108. Similarly, in some embodiments, the server 102 provides output to one or more peripheral devices, such as a display device (e.g., a liquid crystal display ("LCD"), a touch screen, and the like), a printer, a speaker, and the like through the input/output interface 108. In some embodiments, output may be provided within a graphical user interface ("GUI") (e.g., generated by the electronic processor 104 executing instructions and data stored in the memory 106 and presented on a touch screen or other display) that enables a user to interact with the server 102. In other embodiments, a user may interact with the server 102 through one or more intermediary devices, such as a personal computing device, e.g., laptop, desktop, tablet, smartphone, smartwatch or other wearable device, smart television, and the like. For example, a user may configure functionality performed by the server 102 as described herein by providing data to an intermediary device that communicates with the server 102. In particular, a user may use a browser application executed by an intermediary device to access a web page that receives input from and provides output to the user for configuring the functionality performed by the server 102.

As illustrated in FIG. 1, the system 100 includes one or more data sources 112. Each data source 112 may include a plurality of electrical and electronic components that provide power, operational control, and protection of the components within the data source 112. In some embodiments, each data source 112 represents a server, a database, a personal computing device, or a combination thereof. For example, as illustrated in FIG. 1, each data source 112 may include an electronic processor 113 (e.g., a microprocessor, ASIC, or other suitable electronic device), a memory 114 (e.g., a non-transitory, computer-readable storage medium), and an input/output interface 116. The data sources 112 illustrated in FIG. 1 represent one example of data sources and embodiments described herein and may include a data source with additional, fewer, or different components than the data sources 112 illustrated in FIG. 1. Also, in some embodiments, the server 102 communicates with more or fewer data sources 112 than illustrated in FIG. 1. Data source 112 may include a chatbot database, e.g., chatbot database 212 as discussed in more detail below with reference to FIG. 2.

The input/output interface 116 allows the data source 112 to communicate with external devices, such as the server 102. For example, as illustrated in FIG. 1, the input/output interface 116 may include a transceiver for establishing a wireless connection to the server 102 or other devices through the communication network 111 described above. Alternatively or in addition, the input/output interface 116 may include a port for receiving a wired connection to the server 102 or other devices. Furthermore, in some embodiments, the data sources 112 also communicate with one or more peripheral devices through the input/output interface 116 for receiving input from a user, providing output to a user, or a combination thereof. In other embodiments, one or more of the data sources 112 may communicate with the server 102 through one or more intermediary devices. Also, in some embodiments, one or more of the data sources 112 may be included in the server 102.

The memory 114 of each data source 112 may store data, such as a chatbot database and the like. In some embodiments, as noted above, data stored in the data sources 112 or a portion thereof may be stored locally on the server 102 (e.g., in the memory 106).

User device 120 may also be connected to communication network 111, for communication with server 102 and/or with data source 112. Inputs and outputs 118 may flow between server 102, e.g., via input/output interface 108, and user device 120, e.g., via input/output interface 126. Inputs may include chatbot interactions and input test files as described herein below. Outputs may include natural language processing and data analysis, e.g., as performed by a chatbot application programming interface ("API"), as described in more detail below.

A chatbot is software that simulates human-like conversations with users via chat. Its key task is to answer user questions with instant messages. A chatbot may use artificial intelligence, including natural language processing. A chatbot's AI be trained and refined using previous chatbot interactions, including evaluations of whether the chatbot AI accurately identified the chatbot user's intent in typing a text string into the chatbot, and/or whether the chatbot AI chose the correct answer from its databank of potential answers to user utterances.

When a chatbot uses a natural language processing ("NLP") based classifier in a backend system, a deviation may develop between predicted intent and expected intent, for certain chatbot inputs. Such a deviation may be caused by a number of factors, which may include new training of the natural language model. For example, when a new training phrase is added, the underlying natural language model gets updated. The updated model might not understand a particular phrase, even though an earlier version of the model may have understood the same phrase. This may be for a number of reasons, including updates to the model that introduce phrases that are similar to the previously understood phrase, but which are meant to result in different responses by the chatbot. e.g., "pay credit card bill" vs "show credit card bill." This lost understanding may result in unintended responses to end user inquiries when an end user is interacting with the chatbot.

To maintain the quality of responses, regression analysis may be needed before and after training the NLP model, to determine whether user utterances containing certain keywords or phrases may result in incorrect responses. However, a chatbot with a substantial amount of data, such as a chatbot with over 2000 unique request response pairs to test each time, it may take more than two days to perform a manual regression analysis, even with a dedicated test team. Manual testing for each test case, and recording the pass/fail values, to manually generate graphs out of it, was not feasible as the chatbot grows, as the time required to perform it was too great. Manual regression testing also has human limitations and the results may contain human errors. Accordingly, without the solution disclosed by the instant disclosure, partial regression was done instead of complete regression.

Figure 2:
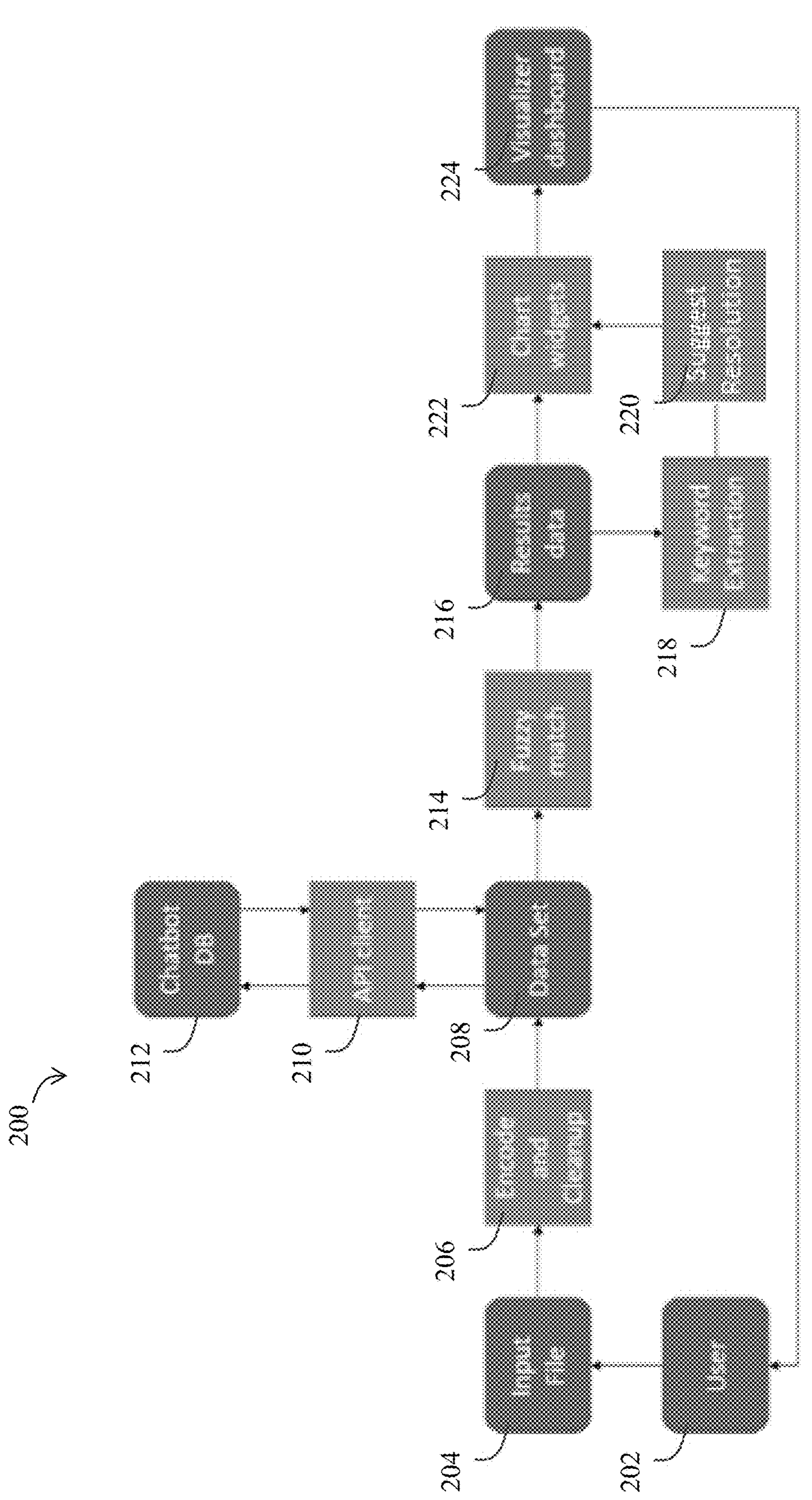
FIG. 2 is a block diagram of a system for automated regression testing in accordance with one aspect of the present disclosure.

Turning now to FIG. 2, a block diagram of a system 200 for automated regression testing is disclosed. The system diagram shows the various components in single cycle of the continuous improvement process implemented using one embodiment of the present disclosure. Persons having skill in the art may realize that system 200 may run the process may run in multiple cycles to achieve improved results. System 200 may be implemented via hardware components of a computing system such as system 100 of FIG. 1

As an initial step, user 202, e.g., a user of, e.g., client device 120, who may be in a role of business analyst, a tester or another administrator of a chatbot system, uploads or otherwise inputs an input test file 204 to system 200. In some embodiments, input test file 204 may be a spreadsheet such as a Microsoft Excel sheet. The input test file may also be a text (e.g., ASCII) file, a file with comma separated values, a database file, an XML file, or any other file with similar functionality that can replicate relevant functions of a table such as a spreadsheet. In some embodiments, input test file 204 contains data relating to a set, e.g., a series, of chatbot interactions. Input test file 204 may contain data points for utterance, expected intent and response values. As used herein, an "utterance" is an input to the chatbot, e.g., by a user. For example, an utterance may be a command or a question, typed into the chatbot's input interface by a user. In some embodiments, there may be one utterance, one expected intent, and one chatbot response, for each chat bot interaction. In some embodiments, utterance data may be actual phrases submitted by end users, to the chatbot, which may in some instances may be submitted in free text typed by the end user, which therefore may vary, including substantially, from phrases that the chatbot is programmed to recognize. In some embodiments, utterance data may be utterances created, simulated, or otherwise assembled, for testing or test cases.

In some embodiments, expected intent may be data relating to a task or question that the chatbot expects that the user is requesting, based on evaluation of the user's utterance by the chatbot as currently configured. In some embodiments, a response value may be the text of the response by the chatbot to the end user's utterance, to be delivered by the chatbot to the user via the user interface, appearing as an answer to the user's question or command. A response may be chosen from a set of responses, which may be associated with the expected intent. In some embodiments, an expected intent and a response value may exist in the data.

Upload file 204 may in some embodiments be uploaded through a dashboard user interface. The dashboard may then pass the input test file to data encoding and cleanup 206. The cleanup aspect of data encoding and cleanup 206 may include removing null values, removing special characters, and other data cleanup and changes to the form of data. The encode aspect of data encoding and cleanup 206 may include encoding the input test file data in standardized data format, which may in some embodiments be a UTF-8 format for variable-length character encoding, to act as an input for next steps.

Once the data set is cleaned up and encoded by data encoding and cleanup 206, the ready data set 208 is passed to API client 210, which may be running on a server such as server 102. API client 210 sends requests for each test case to, and gets responses from, Chatbot database 212, which may be resident in a data source such as data source 112. API client 210 may in some embodiments be a chatbot API such as IBM Watson Assistant API or the like. Calls to API client 210 may include the use of a SDK to obtain chatbot data, e.g., from chatbot database 212.

API client 210 may then receive output data from chatbot database 212. Output data may, in some embodiments, include a predicted intent, an API response and a confidence value, for each chatbot interaction, e.g., for each utterance. API client 210 may then create new columns of information based on the output data, and may create a new data file and/or add the new columns to the existing input test file, so that one or more files exist that contains, for each chatbot interaction and/or test case, the original input data, e.g. utterance, expected intent and chatbot response values, and the output data, e.g. predicted intent, an API response and a confidence value.

The combined data, which in some embodiments may be stored in data set 208, is run through fuzzy match logic 214, to compare two strings of data, which may be the expected intent from the input data, and the predicted intent from the output data, or may be chatbot response from the input data and the API response from the output data. Because responses may be in rich formats, binary match automations give considerably less precision on results. Accordingly, intelligent fuzzy matching with confidence thresholds may be used.

In some embodiments, the fuzzy match logic 214 may measure the difference using or include Levenshtein distance, which may be a numeric representation of the difference between two strings of characters. In some embodiments, fuzzy match logic 214, using Levenshtein distance, may be implemented through a Python library. In some embodiments, a threshold Levenshtein distance, between the expected intent and the predicted intent, or the chatbot response and the API response, may be used to determine if the test case is Pass or Fail. In some embodiments, expected and predicted intents, and/or expected and predicted responses, are both checked for mismatches.

For example, an input query, in a chatbot designed for employees of a company, may request information relating to a so-called "tax holiday" that may have been enacted by a government in the location where the employee is working, which relates to tax withholding from the employee's paycheck. The expected intent may in some cases misinterpret the question as asking about holidays, in other words, days on which the workplace is closed, and an answer relating to holidays may be presented in response. The predicted intent, from the API client 210, may in some cases correctly interpret the question as being about temporary changes to tax withholding, and provide a response relating to tax withholding. A Levenshtein distance between the expected response and the predicted response may show a sufficient degree of difference between the two responses to register the expected response as being a failure. Furthermore, a topic identified from the expected intent (e.g., "holidays") and a topic identified from the predicted intent (e.g., "taxes") may also be compared, e.g., using Levenshtein distance.

While Levenshtein distance may be used in the exemplary embodiment describe here, in other embodiments, other comparison techniques may be used to evaluate responses by a chatbot to utterances.

In some embodiments the output file may be modified, and/or a new file generated, that contains results data 216, which may include the input data, the output data, and the pass/fail result.

Results data 216 may then be stored, and passed to keyword extraction 218. Keyword extraction 218 may in some embodiments be used to generate one or more topic-wise word clouds. Topic wise word clouds may be generated using a python library. Topic wise word clouds may be useful in extracting single word, or short phrase topics, from longer form intents, which may assist in distilling the identity of intents and/or topics that are more failure prone after the recent changes. In some embodiments, keyword word cloud data from keyword extraction 218 may be used to suggest resolutions 220 for those topics or intents that are identified as being prone to failure. As discussed below with reference to FIGS. 4G and 4H, resolutions may be suggested via the user interface where a user may examine results of regression analysis. In some embodiments, the user interface may provide suggestions that may be correlated to the Levenshtein distance, or other comparison, between the expected and predicted intent, the expected and predicted response, or a combination of the two.

Results data 216 and suggested resolutions 220 may be passed to chart widgets 222, which may further analyze results data 216 and suggested resolutions 220 and present them in a visual format, such as a chart or a graph. Charts and/or graphs, generated by chart widgets 222, may be displayed in visualizer dashboard 224.

Chart widgets 222 may include execution history, which may include details of historical regression runs. This may include information relating to previous identified topics and intents that had been identified as prone to failure, in previous iterations of the process described herein and implemented by system 200.

Chart widgets 222 may also include a test case quantity trend. A test case quantity trend chart may be used to determine how many use cases have been added and/or removed from past runs. This may be used to evaluate success of previous changes that were implemented after previous regression test runs.

Chart widgets 222 may also include judgement trends, e.g., trends relating to passes and failures of fuzzy match logic 214 in previous regression runs, e.g., as compared to the present regression run. Pass/Fail trend charts may include run-wise graphs, and may also include detailed breakdowns of current runs including type of failure. Types of failures may include intent mismatches, response mismatches, or complete mismatches which would be a mismatch of both intents and responses. Chart widgets 222 may also include matching confidence graphs. Matching confidence graphs may show confidence values that were generated by API client 210. Matching confidence values may illustrate Fuzzy confidence values for different intents, which may be helpful in addressing anomalies.

Chart widgets 222 may also include bot/company wise failures. Bot or company-wise failure data, illustrated in a chart, may be useful in determining which bot is at more risk to prioritize fixes. In some chatbot systems, separate chatbots may be used for different domains. A domain may be a subject area, a business unit, a geographic location, or the like. The invention also aims at providing domain specific analysis of the test run and suggestions on corrections and improvement, based on the failures.

Chart widgets 222 may also include suggestions for fixing failed cases, which may be a display of the resolutions suggested by suggest resolutions module 220. A suggestions chart may include a complete list of failed test cases and individual suggestions on how to fix them, which may be created using a Machine Learning Decision Tree Classification (DTC) model. A DTC model may be used for predicting resolutions, e.g., in cases where the training data is limited. A DTC model may also give Machine Learning based suggestions for failed test cases. In some embodiments the suggestions may be presented as resolution steps, as shown in the user interface exemplars described below. A suggestion may be generated using the DTC model, and may indicate whether the failure was caused by a response mismatch, an intent mismatch, etc. A resolution step may also indicate, e.g., using a Levenshtein distance or other metric, how different the expected response was when compared to the predicted response, which may be used to indicate a severity of a problem. The invention also aims at providing domain specific analysis of the test run and suggestions on corrections and improvement, based on the failures.

The system as described herein provides many advantages over prior attempts at solving the problem solved thereby. For example, success and failure is measured based on a fuzzy matching system rather than binary, with appropriate confidence levels. This permits a more granular analysis and allows more fine-tuned identification of areas where the chatbot is demonstrating performance problems. Furthermore, the use of input test files are highly customizable.

The systems and methods disclosed herein aim at maintaining the response quality of NLP driven large chatbots to its optimal, by continuously performing Response Quality Checks against the NLP engine in a chatbot. Other attempted solutions involve manual regression, which is impossible to do frequently as the number of queries a chatbot can answer increases. The systems and methods disclosed herein improve regression testing so it is not as prone to human error, records information for each test case in detail and utilizes it to provide lots of analysis thus aiding resolution of failed cases.

Figure 3:
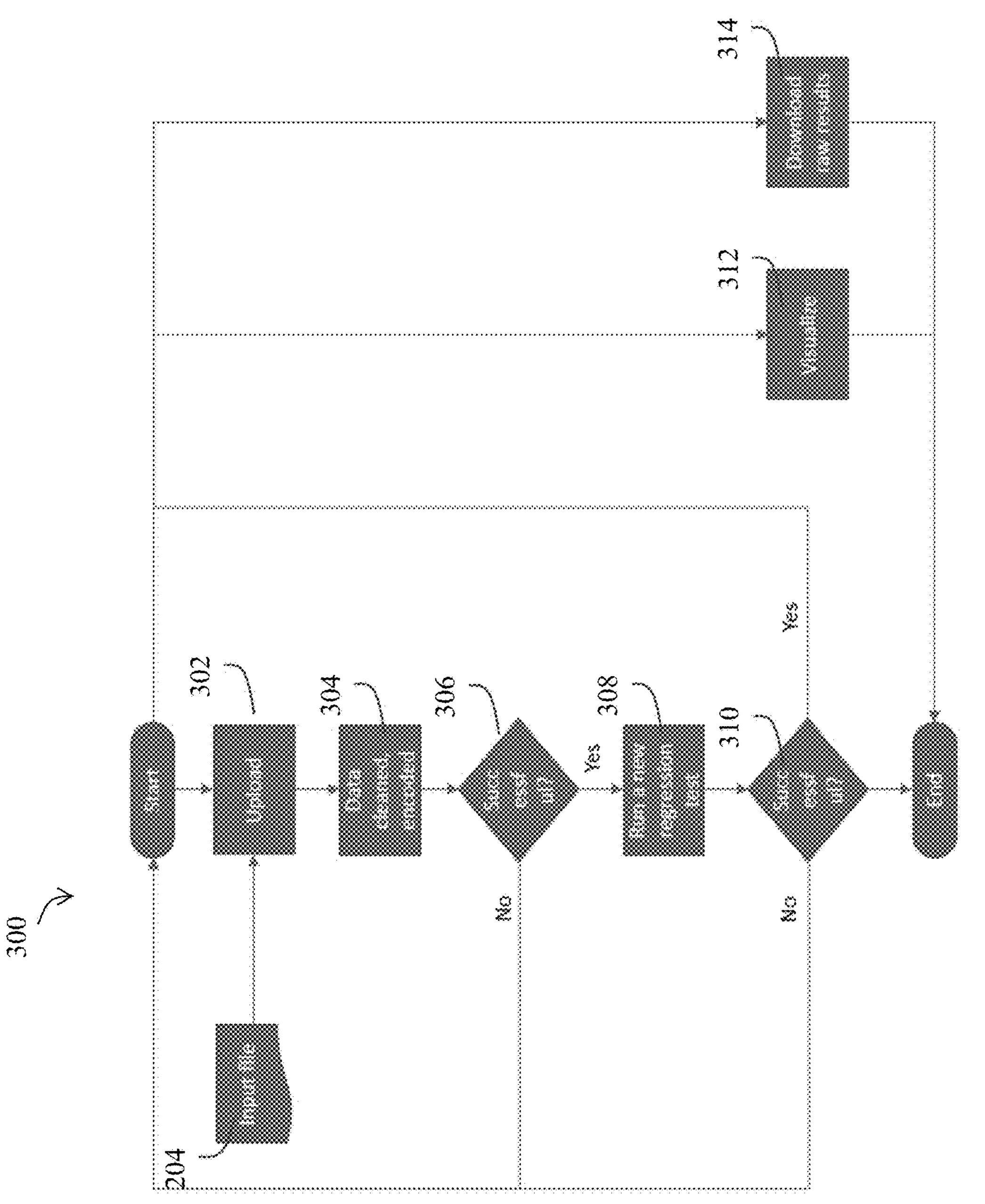
FIG. 3 is a flow diagram of a method in accordance with one aspect of the present disclosure.

Turning now to FIG. 3, a flow diagram for a process 300 for a single instance of regression analysis with reference to the exemplary process of FIG. 2 and in accordance with the present disclosure is shown. Persons having skill in the art will realize that the steps in process 300 may be repeated over time for, e.g., improved analysis or improved results.

A user, such as user 202 of system 200, uploads (302) an input test file, such as input test file 204. The data in the input test file is them cleaned and encoded (304) as discussed above with reference to data cleanup and encoding module 206 of FIG. 2. In some embodiments the file data is encoded in a UTF-8 format, as discussed above. Data is then checked (306) to see if the cleanup and encoding was successful. Checking for successful cleanup may include checking for issues with file like formatting, errors, etc. If cleanup was not successful, the user can upload (302) a new file after corrections are made.

If the cleanup and encode is successful, data is then sent to next step, where the actual regression testing (308) is run, as discussed in detail above with reference to FIG. 2. As discussed in more detail above, the data may be passed to an API client such as API client 210, which may interact with a chatbot database 212 to produce a ready dataset 208.

Ready dataset 208 may then be run through fuzzy match logic 212, which may then produce results data 216.

The result of the regression may be a success or failure message (310). In case of failure, user sees the error reason and based on that can rectify the issue and/or start upload (302) an input test file again. The user can repeat the flow in case of failed regression, after making changes to the chatbot's operation, and feeding new data to the test suite, until desired regression results are obtained. If step 310 returns a result that the test was successful, the user can visualize (312) the analysis for the latest test and download (314) the raw input if desired.

FIGS. 4A through 4G are exemplary user interface renderings that may be used with the system of the present disclosure. For example, some of the user interface exemplars may be created by chart widgets 222 of FIG. 2, and may then be displayed as of visualizer dashboard 224, as discussed above with reference to FIG. 2.

Figure 4A:
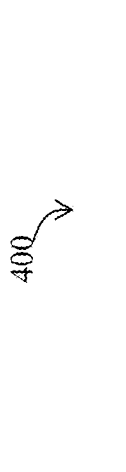
Figure 4A:
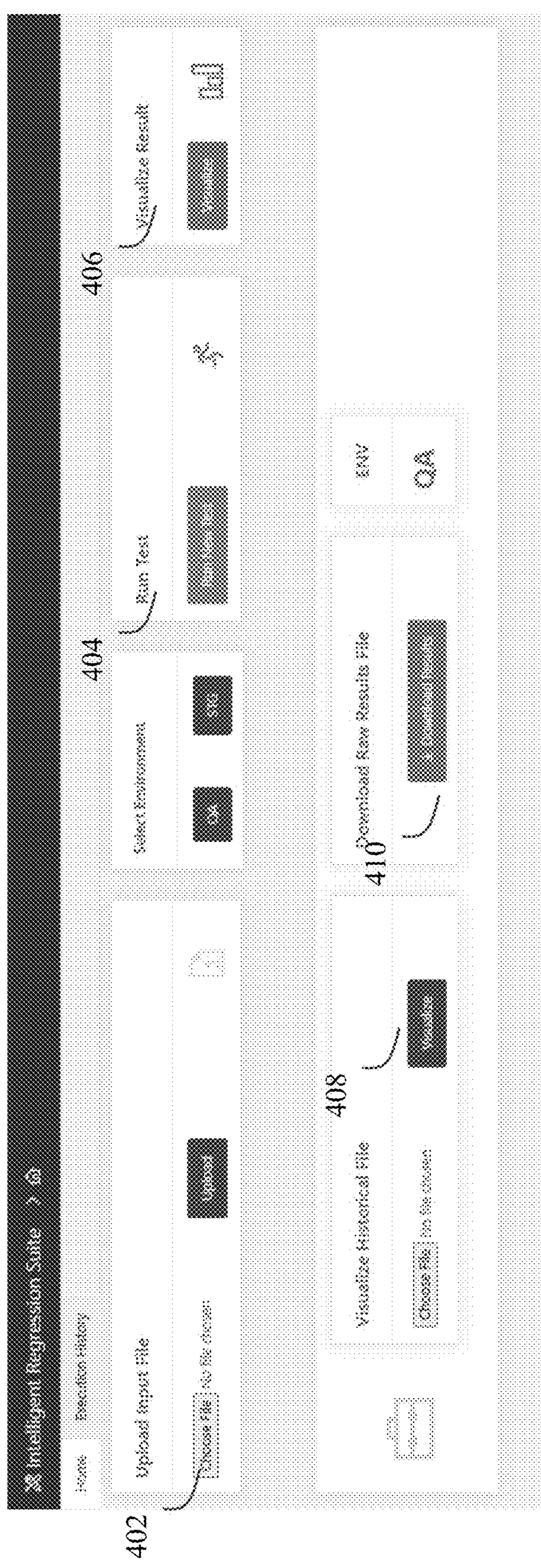
Figure 4B:

FIG. 4A is an exemplar of a home page 400 that may allow a user to interact with a system in accordance with the present disclosure, for example, system 200 of FIG. 2. Home page 400 may include a user interface element 402 to allow the user to upload an input test file, for example, input test file 204 of FIG. 2. Another user interface element 404 may enable the user to run another instance of the regression analysis, e.g., the process 300 of FIG. 3. Another user interface element 406 may enable the user to enter a visualizer dashboard such as visualizer dashboard 224. Another user interface element 408 may enable the user to view historical visualizations, e.g., as shown in FIG. 4B. Another user interface element 410 may enable the user to download results, e.g., in accordance with step 314 of process 300.

Figure 4C:
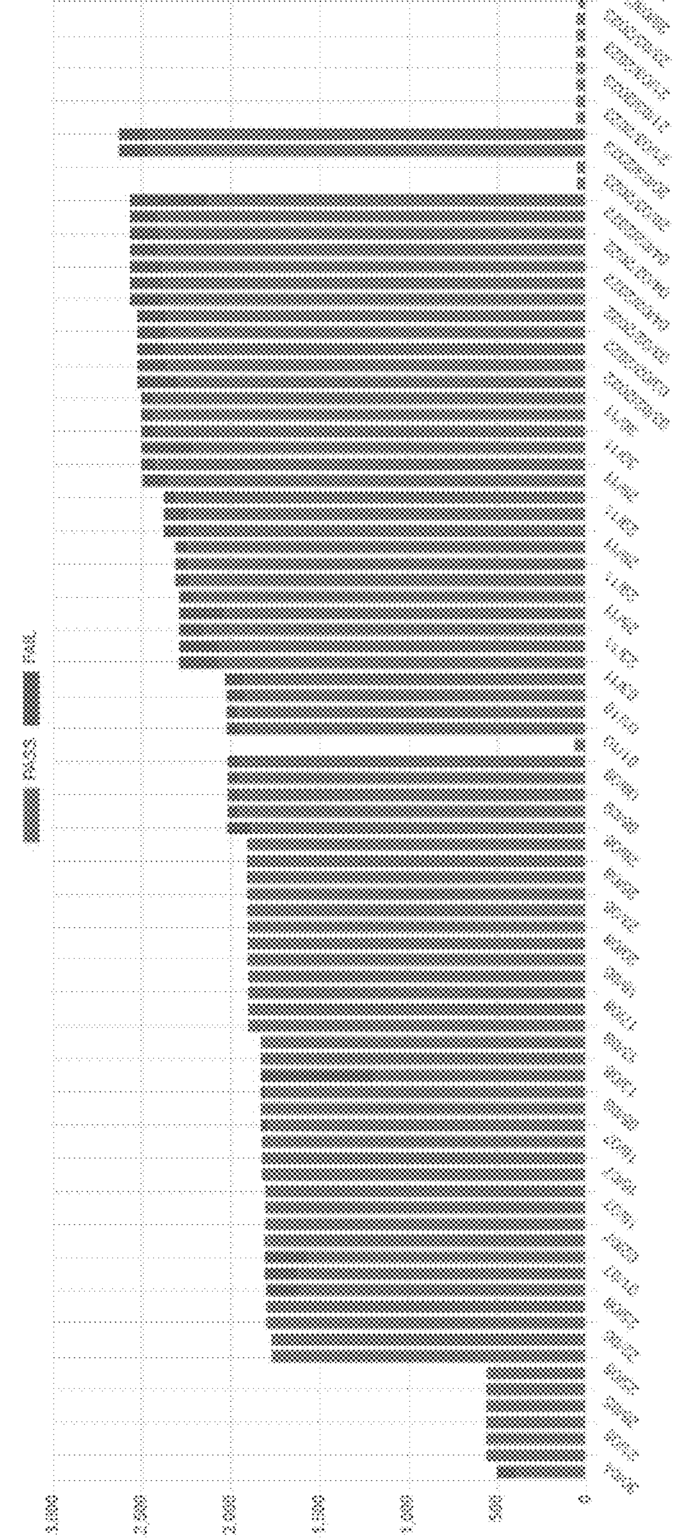

FIG. 4B and FIG. 4C show two aspects of an exemplary of a historical visualizations dashboard 412, in accordance with one aspect of the present disclosure. An execution history 414 is shown, which shows dates and times of prior regression runs, as well as how many cases were run, and pass/fail results. A graph of test cases incremented by run 416 is also shown, which shows how many test cases were run in each iteration of the regression test. A result breakdown trend graph 418 shows how many results were passes and failures after being run through the regression analysis, e.g., fuzzy match logic 214.

Figure 4D:
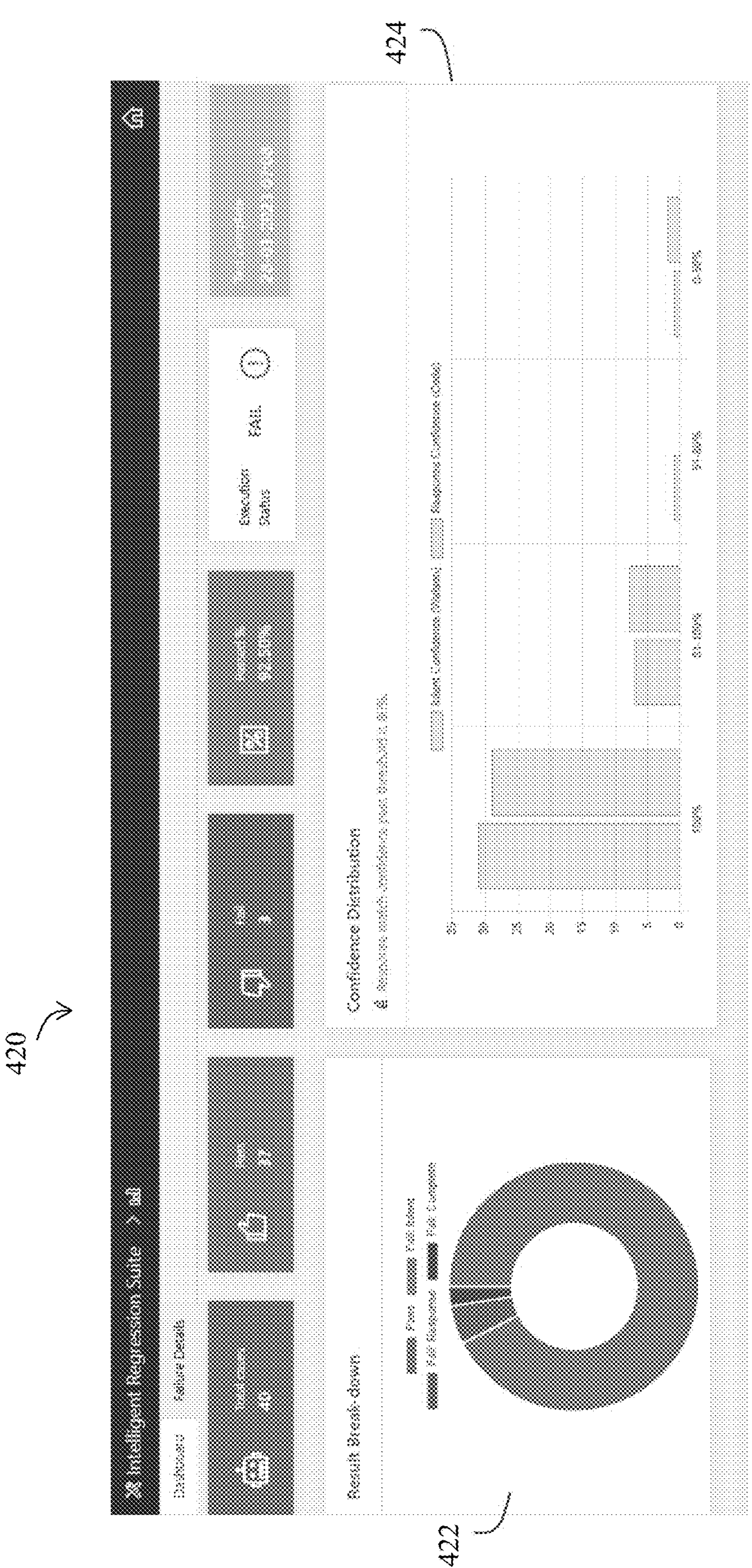
Figure 4E:
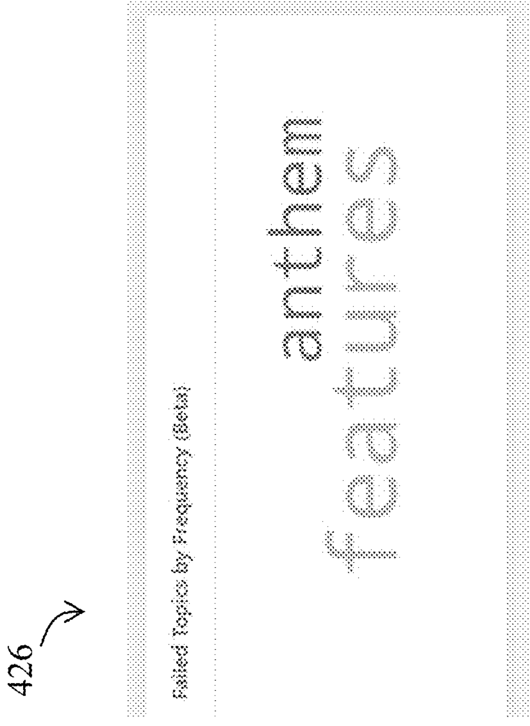

Turning now to FIGS. 4D and 4E, a dashboard 420, e.g., visualizer dashboard 224, is shown. In some embodiments, a user may reach dashboard 420 by interacting with user interface element 410. In FIG. 4D, a result breakdowns pie chart 422 is shown. The results show pass results, and three types of failure results: rail intent, fail response, and fail complete. A bar graph of confidence distribution 424 is also shown. Confidence distribution visualizations may be used to evaluate confidence scores on intent comparisons and response comparisons.

FIG. 4E shows a word cloud 426 that may be created via keyword extraction, e.g., keyword extraction 218 of FIG. 2. As discussed above, word cloud 426 may be used by users to visualize the topics of intents and responses that may be resulting in failures in regression analysis, and may therefore be in the greatest need of improvement.

Figure 4F:
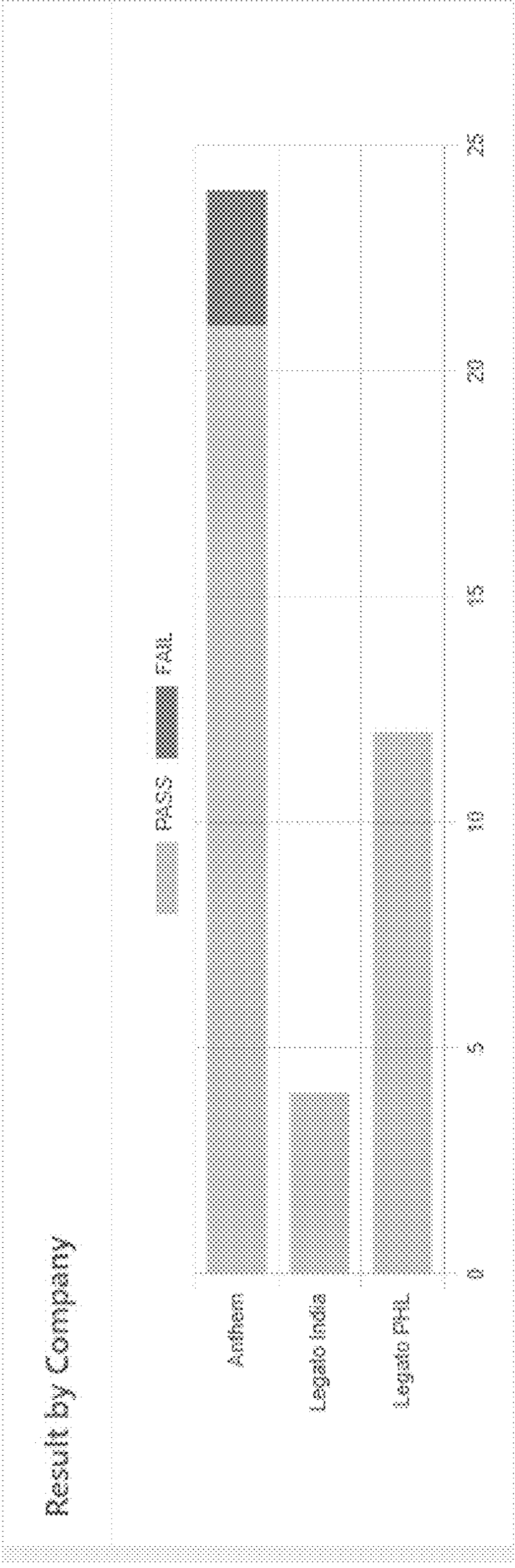

FIG. 4F shows bar graph 428, which may be navigated to from dashboard 420. Bar graph 428 shows domain specific pass/fail analysis for regression analysis, as discussed above.

Figure 4H:
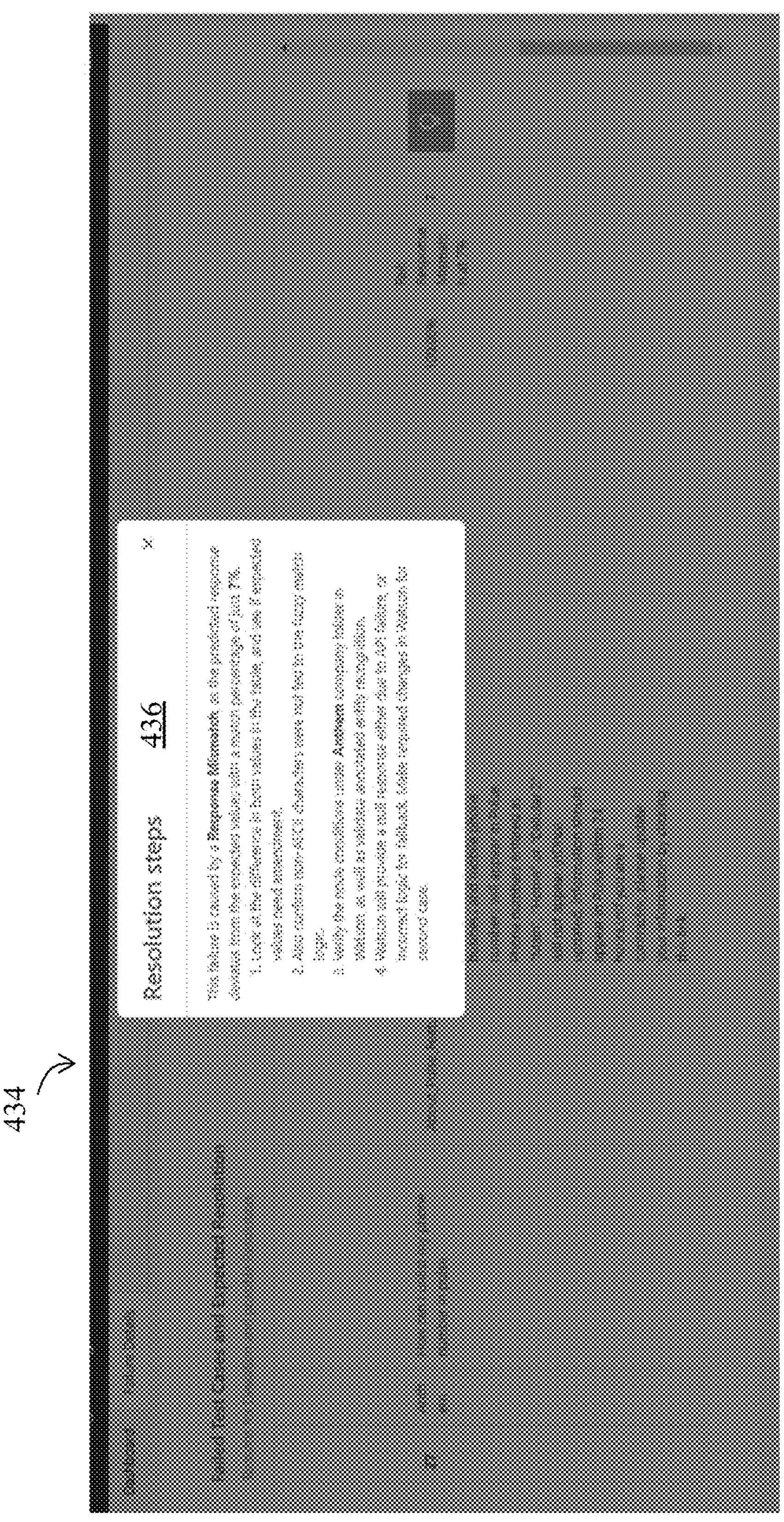

FIGS. 4G and 4H show user interface exemplars relating to detailed failure analysis. As shown in FIG. 4G, a user may navigate to failure details 430 from dashboard 420, wherein failed test cases and expected resolutions may be shown, e.g., in a table format as shown in FIG. 4G. A user interface element 432 may allow the user to see suggested resolutions. Interacting with user interface element 432 may result in the appearance of a resolution steps user interface 434 such as that shown in FIG. 4H. Here, a text box 436 appears, which shows the user that the failure is a "response mismatch," and provides some suggestions for fixing the problem. The response mismatch is determined in accordance with a fuzzy match logic, e.g., fuzzy match logic 214. In some embodiments, a Levenshtein distance may be shown. In the example of text box 436, the user is informed that the expected response and the predicted response have a 7% match percentage. In some embodiments, the mismatch may be an intent mismatch or a complete mismatch, rather than a response mismatch.

Dashboard displays such as those shown in FIGS. 4A through 4H provide many advantages, which are enabled by the analysis system as disclosed herein. Historical performance can be viewed, and can be grouped or broken down by confidence distribution. Domain specific information can be displayed, such as separating results by company or business unit, or subject area, so that areas of concentration can be identified. Word clouds are also helpful to show where problems need to be addressed, by viewing based on commonality and frequency of failures.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A method of improving an accuracy of a natural language processing system for use in a chatbot, the method comprising:

receiving, by a computing device, an input test file via an input test file upload interface, the input test file comprising data relating to a plurality of chatbot interactions, wherein, for each of the plurality of chatbot interactions, the input test file contains data relating to an utterance, an expected intent, and an expected response;

standardizing, by the computing device, the data contained in the input test file;

for each of the plurality of chatbot interactions:

generating, using an artificial intelligence-based chatbot, using the utterance, a predicted intent and a predicted response, wherein the artificial intelligence-based chatbot is trained using previous chatbot interaction data including previous utterances, previous expected intents, previous responses, and data relating to whether a previous response successfully addressed the utterance; and determining, by the computing device, pass or fail results using fuzzy match logic by:

calculating a first Levenshtein distance between the expected response and the predicted response;

calculating a second Levenshtein distance between the expected intent and the predicted intent; and determining that the chatbot interaction failed when either Levenshtein distance exceeds a predetermined threshold, otherwise determining that the chatbot interaction passed;

extracting, using natural language processing, keywords from the failed chatbot interactions;

analyzing, using a machine learning decision tree classifier, the failed chatbot interactions to identify patterns and generate corresponding resolution steps; and generating an interactive dashboard interface displaying at least one of historical performance trends, domain-specific accuracy metrics, visualizations of the keywords, or confidence distributions for the failed chatbot interactions.

2. The method of claim 1, further comprising:

generating an output file including the utterance, the expected intent, the expected response, the predicted intent, the predicted response, and the pass/fail determination.

3. The method of claim 1, wherein generating the interactive dashboard interface includes generating a visualization that displays the extracted keywords in sizes corresponding to their occurrence count in the failed chatbot interactions.

4. The method of claim 1, further comprising:

receiving user input comprising a modified expected response;

calculating a Levenshtein distance between the modified expected response and the predicted response;

determining whether the calculated Levenshtein distance exceeds the predetermined threshold; and updating the pass/fail determination based on the threshold comparison.

5. The method of claim 1, further comprising:

performing statistical analysis on the failed and passed chatbot interactions; and displaying statistical metrics in the interactive dashboard interface.

6. The method of claim 1, wherein generating the interactive dashboard interface comprises displaying pass/fail analysis for chatbot domains, wherein each domain represents a different subject area, business unit, or geographic location.

7. The method of claim 1, wherein analyzing the failed chatbot interactions comprises:

generating confidence scores based on the Levenshtein distances;

displaying a visualization of the confidence scores; and displaying trends in chatbot interaction results across regression test runs.

8. The method of claim 1, wherein extracting keywords comprises generating a word cloud visualization displaying the extracted keywords from the failed chatbot interactions, wherein each keyword's display size corresponds to its occurrence count.

9. The method of claim 1, wherein generating the interactive dashboard interface comprises displaying execution history showing dates, times, and pass/fail results of regression test runs.

10. The method of claim 1, wherein standardizing the data comprises removing null values from the data, removing special characters from the data, and encoding the data in UTF-8 format.

11. A system for of improving an accuracy of a natural language processing system for use in a chat bot, the system comprising a processor and a memory, the memory having stored thereon computer readable instructions that, when executed by the processor, cause the processor to perform the steps of:

receiving an input test file via an input test file upload interface, the input test file comprising data relating to a plurality of chatbot interactions, wherein, for each of the plurality of chatbot interactions, the input test file contains data relating to an utterance, an expected intent, and an expected response;

standardizing the data contained in the input test file;

for each of the plurality of chatbot interactions:

generating, using an artificial intelligence-based chatbot, using the utterance, a predicted intent and a predicted response, wherein the artificial intelligence-based chatbot is trained using previous chatbot interaction data including previous utterances, previous expected intents, previous responses, and data relating to whether a previous response successfully addressed the utterance; and determining pass or fail results using fuzzy match logic by:

calculating a first Levenshtein distance between the expected response and the predicted response;

calculating a second Levenshtein distance between the expected intent and the predicted intent; and determining that the chatbot interaction failed when either Levenshtein distance exceeds a predetermined threshold, otherwise determining that the chatbot interaction passed;

extracting, using natural language processing, keywords from the failed chatbot interactions;

analyzing, using a machine learning decision tree classifier, the failed chatbot interactions to identify patterns and generate corresponding resolution steps; and generating an interactive dashboard interface displaying at least one of historical performance trends, domain-specific accuracy metrics, visualizations of the keywords, or confidence distributions for the failed chatbot interactions.

12. The system of claim 11, wherein the computer readable instructions, when executed by the processor, cause the processor to perform the further steps of:

generating an output file including the utterance, the expected intent, the expected response, the predicted intent, the predicted response, and the pass/fail determination.

13. The system of claim 11, wherein generating the interactive dashboard interface includes generating a visualization that displays the extracted keywords in sizes corresponding to their occurrence count in the failed chatbot interactions.

14. The system of claim 11, wherein the computer readable instructions, when executed by the processor, cause the processor to perform the further steps of:

receiving user input comprising a modified expected response;

calculating a Levenshtein distance between the modified expected response and the predicted response;

determining whether the calculated Levenshtein distance exceeds the predetermined threshold; and updating the pass/fail determination based on the threshold comparison.

15. The system of claim 11, wherein the computer readable instructions, when executed by the processor, cause the processor to perform the further steps of:

performing statistical analysis on the failed and passed chatbot interactions; and displaying statistical metrics in the interactive dashboard interface.

16. The system of claim 11, wherein generating the interactive dashboard interface comprises displaying pass/ fail analysis for chatbot domains, wherein each domain represents a different subject area, business unit, or geographic location.

17. The system of claim 11, wherein analyzing the failed chatbot interactions comprises:

generating confidence scores based on the Levenshtein distances;

displaying a visualization of the confidence scores; and displaying trends in chatbot interaction results across regression test runs.

18. The system of claim 11, wherein extracting keywords comprises generating a word cloud visualization displaying the extracted keywords from the failed chatbot interactions, wherein each keyword's display size corresponds to its occurrence count.

19. The system of claim 11, wherein generating the interactive dashboard interface comprises displaying execution history showing dates, times, and pass/fail results of regression test runs.

20. The system of claim 11, wherein standardizing the data comprises removing null values from the data, removing special characters from the data, and encoding the data in UTF-8 format.

* * * * *